(12) United States Patent
Yakubov et al.

(10) Patent No.: US 9,914,292 B2
(45) Date of Patent: Mar. 13, 2018

(54) ADDITIVE MANUFACTURING DEVICE

(71) Applicant: Massivit 3D Printing Technologies LTD, Lod (IL)

(72) Inventors: Igor Yakubov, Herzliya (IL); Moshe Uzan, Bet Shemesh (IL)

(73) Assignee: MASSIVIT 3D PRINTING TECHNOLOGIES LTD, Lod (IL)

( * ) Notice: Subject to any disclaimer, the term of this patent is extended or adjusted under 35 U.S.C. 154(b) by 415 days.

(21) Appl. No.: 14/676,902

(22) Filed: Apr. 2, 2015

(65) Prior Publication Data
US 2016/0288413 A1    Oct. 6, 2016

(51) Int. Cl.
| | |
|---|---|
| B29C 67/00 | (2017.01) |
| B33Y 30/00 | (2015.01) |
| B33Y 10/00 | (2015.01) |
| B29C 64/129 | (2017.01) |
| B29C 64/20 | (2017.01) |

(52) U.S. Cl.
CPC ............ B33Y 30/00 (2014.12); B29C 64/129 (2017.08); B29C 64/20 (2017.08); B33Y 10/00 (2014.12)

(58) Field of Classification Search
CPC ............ B29C 67/0051; B29C 67/0055; B29C 67/0062; B29C 67/0066; B29C 67/0085; B29C 67/007; B33Y 10/00; B33Y 30/00

USPC ................ 425/174.4, 375; 264/401, 494
See application file for complete search history.

(56) References Cited

U.S. PATENT DOCUMENTS

| | | | | |
|---|---|---|---|---|
| 2009/0020901 A1* | 1/2009 | Schillen | ................ | B29C 70/88 264/31 |
| 2009/0309267 A1* | 12/2009 | Boot | .................. | B29C 67/0066 264/496 |
| 2012/0195994 A1* | 8/2012 | El-Siblani | ............. | B29C 67/007 425/174.4 |
| 2014/0239554 A1* | 8/2014 | El-Siblani | ........... | B29C 67/0051 264/482 |
| 2015/0151489 A1* | 6/2015 | Elsey | ................. | B29C 67/0062 264/401 |

\* cited by examiner

*Primary Examiner* — Matthew J Daniels
*Assistant Examiner* — Lawrence D. Hohenbrink, Jr.
(74) *Attorney, Agent, or Firm* — Manelli Selter PLLC; Edward J. Stemberger

(57) ABSTRACT

Disclosed is an additive manufacturing device that facilitates the manufacturing of relatively large 3D objects at a short time. The device uses radiation-curable resin and radiation curing system. Layer shaping members are disclosed to provide both for shorter manufacturing time of an object, minimizing waste of resin and reduction of weight. Curing radiation sources are also designed to minimizing waste of resin and manufacturing time.

16 Claims, 11 Drawing Sheets

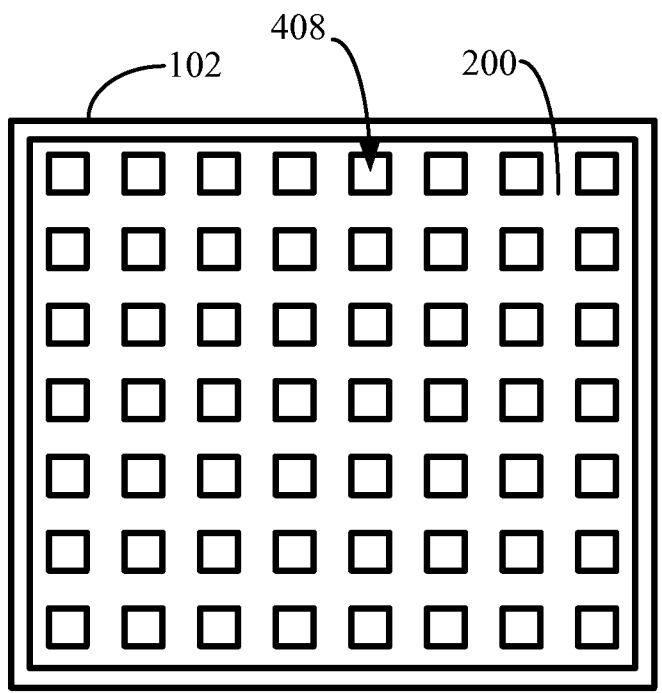
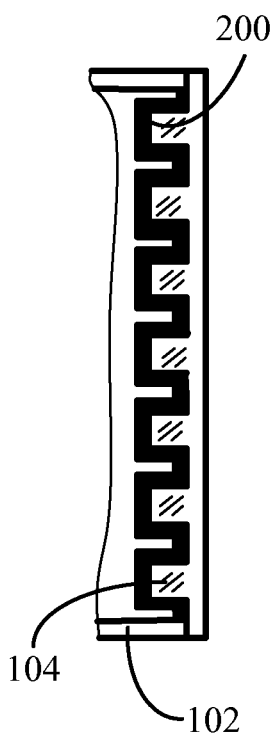
FIG. 4A
FIG. 4B
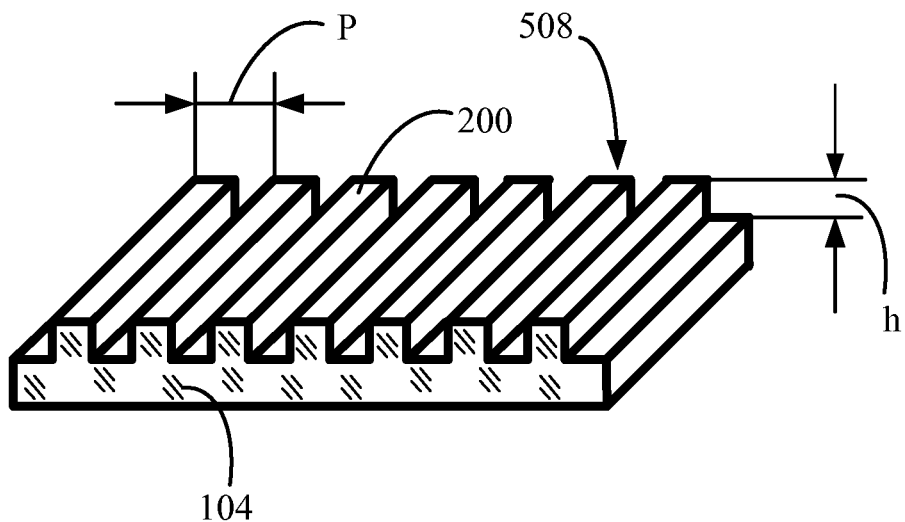
FIG. 5

ADDITIVE MANUFACTURING DEVICE

TECHNOLOGY FIELD

The apparatus and method are related to the field of additive manufacturing and particularly to additive manufacturing devices utilizing radiation-curable resins.

BACKGROUND

In some additive manufacturing (AM) devices a container is provided with a radiation-curable resin (RCR) in the container. The flat bottom of the container is typically made of a transparent material that allows the resin curing radiation to be transmitted through the bottom and interact with a radiation-curable resin layer adjacent to the bottom of the container. The transmitted through the bottom curing radiation interacts/cures a thin, adjacent to the bottom, layer of resin, typically 10-100 um thick. Once a layer of resin is cured the entire manufactured 3D object is lifted, typically 10-100 um above the bottom of the container, allowing to cure another layer of radiation-curable resin forming the object. This way the object is built a layer after a layer until the entire object is produced above the bottom of the container.

Additive manufacturing (AM) devices where a layer of radiation-curable resin is deposited on the top of an earlier deposited layer are also known and described for example, in U.S. Pat. Nos. 6,586,494, 6,966,960, 7,291,002, and 8,509,933 and European patent EP2654412. Typically, the thickness of the cured or solidified material layer is about 10-60 micron. This is because the radiation-curable resin absorbs a large part of the curing radiation and makes it almost impossible to solidify thicker layers of radiation-curable resin.

Such additive manufacturing devices are typically intended to manufacture objects with relatively small size and high dimensional accuracy. Manufacture of such objects results in a relatively long time of production. For example, production of a small 50×50×50 mm object would typically take more than an hour. Manufacture of larger size objects would naturally take more time making the method not suitable and cost effective for additive manufacture of large size objects, for example, of 1000×1000 mm or even 5000× 5000 mm.

Glossary

"Radiation-curable resin"—as used in the current disclosure means any liquid or gel material that is in a liquid state or flow able state and becomes solid on interaction with radiation or heat.

"3D pattern"—as used in the current disclosure means a generally non-flat surface on which a relief such as a 1D pattern, 2D pattern or 3D pattern is produced. The patterns could be of similar or different size in direction of each of three axes (X, Y, and Z). The 3D pattern could be a periodic pattern and the period of the pattern could be equal or different in direction of each of three axes (X, Y, and Z).

"Direction"—as used in the current disclosure in the context of pattern of a surface means direction of x or direction of y or the direction of z in the Cartesian coordinate system.

"Transparent"—as used in the current disclosure means "at least partially transparent" to the radiation used to cure the resin.

DLP is a digital micro-mirror device originally developed in 1987 by Dr. Larry Hornbeck of Texas Instruments. The DLP imaging device is currently used by most available on the market video projectors.

BRIEF SUMMARY

An apparatus for additive manufacturing of 3D objects includes a container configured to contain a radiation-curable resin and a radiation source configured to provide the curing radiation to cure at least a portion of the radiation-curable resin into a solid layer. The container includes a bottom with a surface that is in contact with the radiation-curable resin. The particular surface bears a 3D pattern and the cured (solidified) or solid layer of the radiation curable resin is a replica of the 3D pattern of the bottom surface, which is in contact with the radiation-curable resin.

A 3D object manufactured by the apparatus is a stack of 3D layers and not a stack of flat layers as it is manufactured by existing apparatuses. The dimensions of the three-dimensional layers exceed 8 to 20 times the thickness of the flat layers. The time required to manufacture a 3D object is generally proportional to the number of cured radiation curable resin layers of which the 3D object is made. Accordingly, the manufacturing time by the described apparatus is 8 to 20 times shorter, making feasible additive manufacture of large 3D objects.

BRIEF DESCRIPTION OF THE DRAWINGS

The apparatus and method will be better understood in reference to the following Figures:

FIGS. 3A, 3B, 4A, 4B, and 5 are examples that illustrate different 3D patterns produced on bottom surface of the container containing radiation-curable resin;

DETAILED DESCRIPTION

The maximal thickness of a radiation curable resin that could be cured by the curing radiation is limited by the absorption of the curing radiation in the radiation-curable resin. This limits the rate at which the 3D object layers could be added and cured or solidified. The possible 3D object material addition rate also limits the size of the objects that could be produced at an acceptable cost and time. The current document discloses an apparatus and a method of employing an apparatus that facilitates faster manufacturing of 3D objects.

Figure 1:
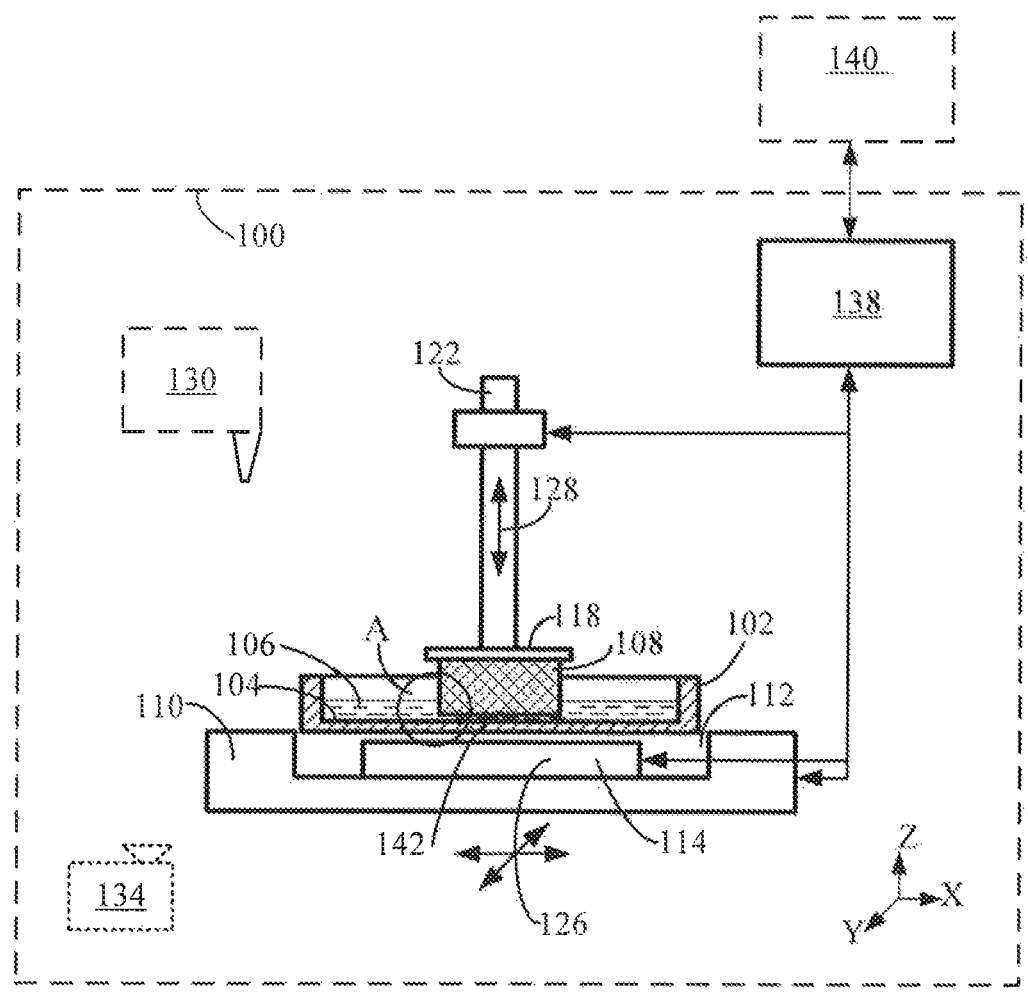
FIG. 1 is a simplified illustration of an example of an additive manufacturing apparatus using bottom radiation to cure radiation-curable resin.

Reference is made now to FIG. 1 which is a simplified illustration of an example of additive manufacturing apparatus using bottom radiation to cure radiation-curable resin. Apparatus 100 includes a container 102 shown in a cross section. Container 102 includes at least a bottom 104 (the structure of the bottom will be described later) that could be made of a material transparent to curing radiation. Container 102 is configured to contain radiation-curable resin 106. Container 102 rests on support 110. In some examples, support 110 could be configured to move in at least two directions, typically, these would be the directions of coordinate axis X and Y. In some examples, support 110 could be configured to move in three directions, typically, these would be the directions of coordinate axis X, Y, and Z. Existing motion providing mechanisms or actuators could be employed to facilitate movement of support 110 in one, two or three directions.

Typically, also not necessary, the radiation source 114 could be placed under container 102 performing what is termed as down-up additive 3D object manufacture. The curing radiation source 114 could be a matrix of LEDs, a Xenon Lamp, a mercury vapor lamp, a solid state laser, a gas laser, or other source of curing radiation. Curing radiation source 114 could be made similar in size or equal to bottom 104 of container 102. When the size of radiation source 114 is smaller than the size of bottom 104 of container 102, radiation source 114 could be configured to move in recess 112 in two directions as shown by arrows 126, such that the curing radiation emitted by curing radiation source 114 could reach every point at the bottom 104 of container 102. Existing motion providing mechanisms or actuators could be employed to facilitate movement of curing radiation source 114 in both X and Y directions.

In some examples, a DLP® light switch, commercially available from Texas Instruments, Inc., Dallas, Tex. 75243 USA, could be used to selectively transmit curing radiation to cure only certain areas of object 108 to be manufactured. The DLP light switch could be coupled with Xenon or a mercury vapor lamp or other source of curing radiation. In another example, a scanning laser beam could be used to selectively transmit curing radiation to cure only certain areas of object 108 to be manufactured.

Apparatus 100 also includes a base 118 configured to adhere to one of the surfaces of object 108. Base 118 is connected to a rod 122, which schematically represents a mechanism such as a screw with a nut or a rack and pinion mechanism configured to displace base 118 with adhered to it object 108 in the direction of arrow 128, which typically would be the Z axis direction.

Apparatus 100 could include different auxiliary units. For example, unit 130 could be configured to constantly or periodically replenish radiation curable resin consumed in process of object 108 manufacturing. Unit 134 could be configured to drain remaining in container 102 after completion of object 108 manufacturing, radiation curable resin.

Computer 138 governs operation of apparatus 100 and all of apparatus 100 units or modules. Computer 138 could be configured to control: container support 110 movements in each of the mentioned above directions; movement of base 118 and rod 122; operation of curing radiation sources 114 and their movement; operation of the DLP® light switch or of the scanning laser beam; activate radiation curable resin replenishment and drainage. Computer 138 could be configured to displace support 110 on a desired distance along each of the three coordinate axes.

Computer 138 could also be configured to receive object 108 design data from a Computer Aided Design (CAD) system 140 and adapt the design data to a particular manufacturing process. Typically, CAD system 140 would not be a part or a component of additive manufacturing apparatus 100, although computer 138 of apparatus 100 could run suitable CAD software to facilitate object 108 preview and other operations that could assist apparatus 100 operation.

Figure 2:
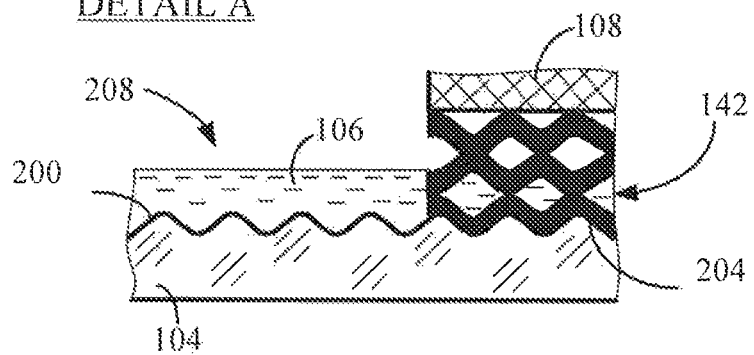
FIG. 2 is a schematic illustration of a cross section of a bottom of the container containing radiation-curable resin according to an example.
Figure 3A:
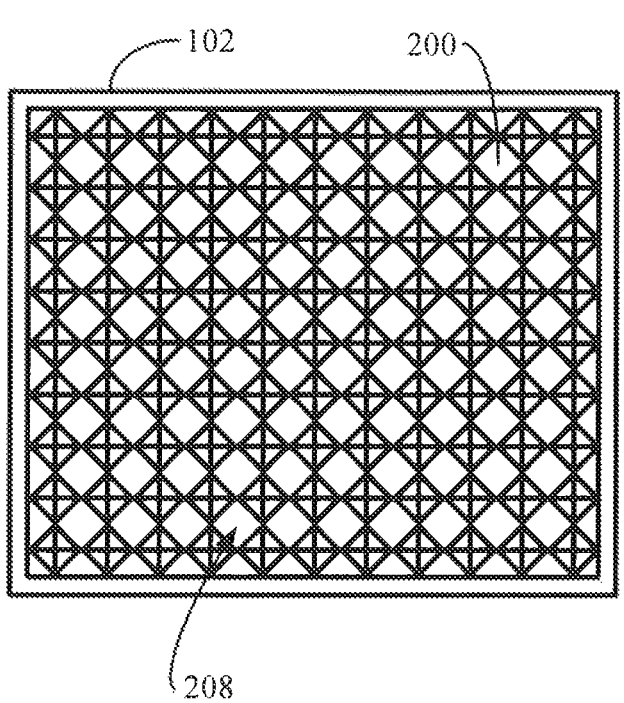
Figure 3B:
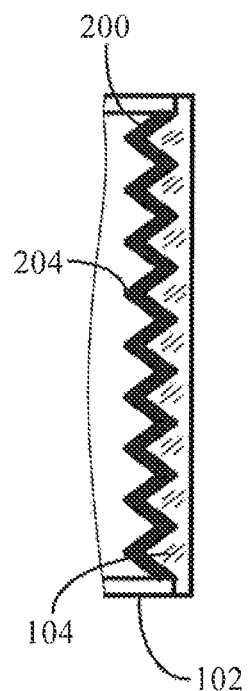

FIG. 2 is a schematic illustration of a cross section of the bottom of the container according to an example. The known apparatuses or systems for additive manufacture of 3D objects typically, in what is termed as down-up additive manufacture, have a transparent bottom with flat surfaces and each cured layer is also flat. In the present apparatus 100 bottom 104 of container 102 includes a surface 200 that bears a 3D pattern 208 and the cured (solidified) or solid layer 204 of the radiation curable resin is a replica of the 3D pattern 208 of bottom surface 200, which is in contact with the radiation-curable resin 106.

The 3D pattern that surface 200 bears, could be a periodic pattern or a non-periodic pattern. It could be a periodic pattern in at least one direction or two directions or all three directions. The period of the 3D pattern that surface 200 bears, could be the same in all of the three directions or different in at least one direction. A variety of 3D patterns such as for example, patterns 208, 408, 508 and others, could be produced on surface 200. FIGS. 3A, 3B, 4A, 4B and 5 illustrate different 3D patterns formed on surface 200 of bottom 104, which in course of 3D object 108 manufacture are in contact with the radiation-curable resin 106. In one example the 3D pattern could be a non-periodic pattern.

FIG. 5 also illustrates some of the parameters of a 3D pattern produced on surface 200 of bottom 104 of container 102 according to an example. Letter "P" denotes the length or a period of one cycle of the pattern 508 produced on surface 200 of bottom 104 of container 102 and the amplitude of the 3D pattern is denoted as "h". The term spatial frequency will also be used in reference to the 3D pattern of surface 200 and it means spatial frequency F of 1/P. Such terms in reference to the surface 200 of bottom 104 of the container will be used for different types of bottom surfaces 200 patterns 208 and the specific usage would be understood from the context in reference to the particular bottom surface discussed. The amplitude of the 3D pattern could vary between 50 micron to 900 micron and more typically between 100 micron and 250 micron and the spatial frequency could vary between 1 to 50 periods per centimeter.

The 3D patterns of surface 200 could for example, be manufactured by molding container 102 bottom 104 using a mold with the desired pattern. The mold material and manufacturing process would depend on the material used for container bottom 104. Common known glass molding techniques could be used for molding of different patterns on surface 200 of bottom 104 of the container. Other than glass, transparent for curing radiation materials also could be used for bottom 104 of container 102 manufacturing.

Curing radiation transmitted through the 3D structure could be partially reflected at the boundary with the radiation-curable resin. Proper selection of the ratio of the refractive indices of the materials used for bottom 104 and the refractive indices of the radiation-curable resin 106 could facilitate effective radiation-curable resin 106 curing process. In some examples, container 102 bottom 104 could have a 3D pattern on surface 200 and another 3D pattern or a diffractive or holographic pattern facilitating effective curing radiation penetration of the curing radiation into the radiation-curable resin.

One of the problems associated with the existing 3D objects manufacturing equipment is related to the completeness and filling time of the liquid layer of radiation-curable resin 106 (FIG. 1) that fills-in a gap 142 between the earlier manufactured and solidified radiation-curable resin layer 204 (FIG. 2). In existing 3D printing equipment, gap 142 is to be filled by the liquid radiation-curable resin 106 (FIGS. 1 and 2) is 25 to 50 micron and surface tension forces impede fast and complete filling of the gap. Frequently, to facilitate the empty volumes filling, vibrations are applied to container 102 or object 108. 3D patterns produced on surface 200 of bottom 102 of apparatus 100 could vary between 50 micron to 1000 micron and more typically between 100 micron and 250 micron. Such gaps are sufficient to avoid negative effects that could be caused by the surface tension forces and facilitate fast filling of gap 142 between the earlier manufactured and solidified radiation-curable resin layer 204 and bottom surface 102.

Figure 6A:
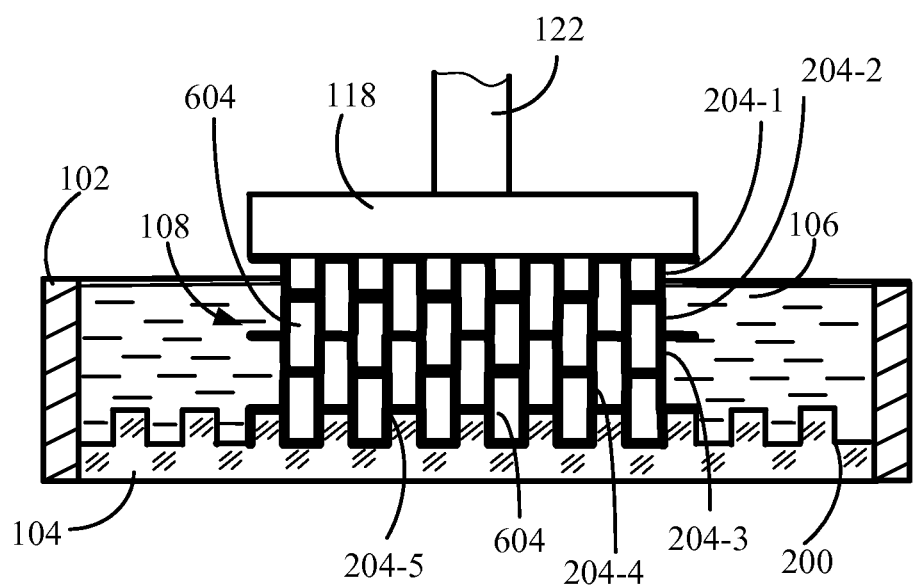
FIGS. 6A and 6B are schematic illustrations of a 3D object manufacturing process according to an example.

FIG. 6A is a schematic illustration of a 3D object down-up manufacturing process according to an example. 3D object 108 that is being manufactured is adhered to base 118, that is connected to rod 122, which could be a screw with a nut or a rack and pinion mechanism configured to displace base 118 with adhered to it object 108 in the direction of the Z axis.

3D object 108 is shown at a phase of adding a new, to be cured material 106 layer 204-5 between the earlier produced object's 108 layers (204-1 through 204-4) and surface 200 of bottom 104 bearing the 3D pattern. Each of the cured resin layers 204-1 through 204-4 are a replica of surface 200 3D pattern. The 3D pattern parameters, for example, the amplitude of the 3D pattern could define the distance between the current 204-5 and earlier produced object 108 layers 204-4. For example, if the amplitude of the 3D pattern produced on surface 200 of bottom 104 is 250 micron, the amplitude of cured radiation curable resin layer 204 would also be 250 micron. Assuming that the 3D object is a cuboid with 100×100×100 mm, only 400 cured resin layers would be required to produce such a cuboid.

The time required to manufacture a 3D object is generally proportional to the number of cured radiation curable resin layers 204 of which the 3D object is made. It is known that conventional 3D object additive manufacturing methods, practically do not support curing or solidification of curable resin layers thicker than 20-25 micron. Assuming that the cured layer produced by conventional additive manufacturing methods would be 25 micron thick, manufacturing of cuboid 108 would require deposition and curing or solidification of 4000 layers. This means that manufacturing cuboid 108 by the present method would be 10 (ten) times faster than manufacturing of the same cuboid 108 by conventional additive manufacturing methods. It also means that the weight of cuboid 108 would be a fraction of the weight of a similar cuboid manufactured by conventional additive manufacturing methods. This weight advantage and material savings are particularly important for additive manufacture of large 3D objects.

Curing radiation source 114 (FIG. 1), for example, a DLP® with a lamp or a scanning laser beam could be configured to project a 2D curing radiation pattern focused within curable resin layer 204 to cure or solidify the next 3D object (cuboid) layer. In cases where the radiation source cannot irradiate the entire cross section of bottom 104 or cannot provide proper radiation dose for curing curable layer 204 or a part of it, radiation source 114 could be, as explained above, translated in X-Y plan, although in some examples translation in direction of Z axis/plan or even angular translation could be implemented (FIG. 1) to facilitate delivery of a proper radiation dose for curing or solidifying radiation curable resin layer 204 for objects with cross section larger than the dimensions of the radiation source 114.

Following curing or solidification of a current layer 204-5 of liquid volume of radiation curable resin 106, object base 118, to which object 108 is adhered, moves 250 micron in the direction of arrow 128 to provide for the manufacture of the next layer 204. The process continues until the manufacture of 3D object 108 is accomplished.

For the simplicity of explanation the 3D pattern produced in surface 200 of bottom 104 and illustrated in FIG. 5 is a periodic pattern in one direction. 3D object 108 is manufactured as a stack of 3D layers 204. Layers 204 are shown to be in registration with each other. Apparatus 100 produces 3D object 108 as a three dimensional periodic structure with hollow volumes 604 (FIG. 6) located in free spaces according to the period or periods of 3D pattern produced on surface 200 of bottom 104. In some examples, it could be desired to reduce the size and period of hollow volumes 604. Computer 138 (FIG. 1) could be configured to displace support 110 on a desired distance along each of the three coordinate axes. Support 110 (FIG. 1) could be displaced on a distance equal to the period of the 3D pattern produced on surface 200 of bottom 104 or on a fraction of the 3D pattern period. The fraction of the 3D pattern period could be equal to 0.1, 0.2, 0.32, 04, 0.5, 0.6, 0.65, 0.7, and 0.8 or any other fraction of the 3D pattern period as illustrated in FIG. 7. In some examples, the shift could be larger than the 3D pattern period.

Figure 6B:
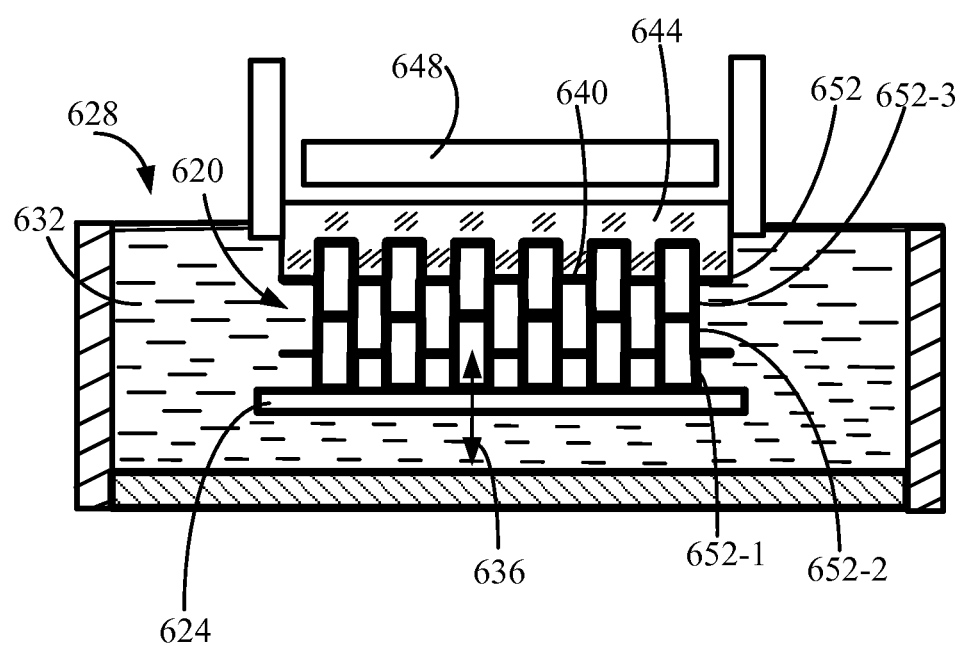

FIG. 6B is a schematic illustration of a 3D object up-down manufacturing process according to an example. 3D object 620 that being manufactured is adhered to a support 624 placed into a tank 628 filled in with radiation curable polymer 632. Support 624 is configured to move as shown by arrow 636. Surface 640 of base 644 bears a 3D pattern similar to pattern produced in surface 200 of bottom 104 (FIGS. 2-5). Surface 640 is in contact with radiation curable polymer 632. A curing radiation source 648 such as for example, a DLP with a lamp or a scanning laser beam could be configured to project a 2D curing radiation pattern focused within curable resin layer 652 being in contact with surface 640 to cure or solidify the radiation curable resin layer being in contact with the 3D pattern made in surface 640.

3D object 620 is shown at a phase of adding a new, to be cured material layer 652 between the earlier produced object's 620 layers (652-1 through 652-3) and surface 640 bearing the 3D pattern. Each of the cured resin layers 652-1 through 652-3 are a replica of surface 640 3D pattern. The parameters of the 3D pattern could be similar to parameters of the 3D pattern produced in surface 200 of bottom 104.

Figure 7A:
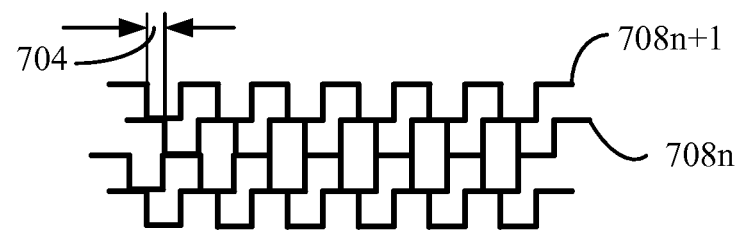
FIGS. 7A through 7D illustrate examples of different shifts between neighbor layers of a 3D object.
Figure 7B:
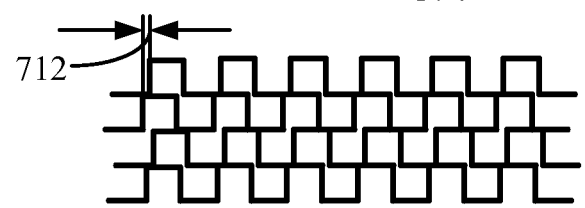

FIG. 7A illustrates a shift 704 between two neighbor layers 708 similar to layers 204 equal to a quarter of the 3D pattern period "P". FIG. 7B illustrates a shift 712 between two neighbor layers 708 equal to about one tenth of the 3D pattern period "P".

Figure 7C:
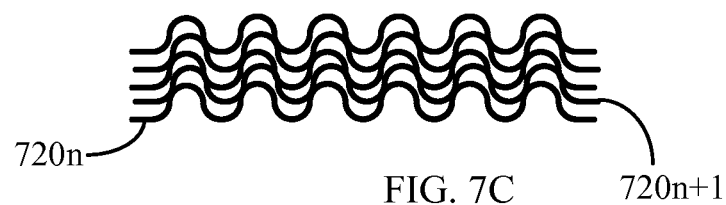
Figure 7D:
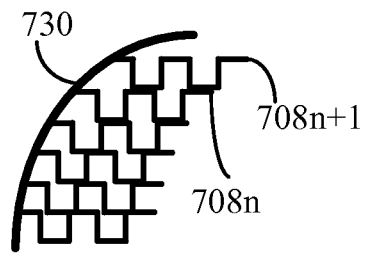

Depending on the 3D pattern, curing of some segments, for example, segments including sharp bends of the surface could result in non-uniform cured layer thickness. In some examples the 3D pattern could be composed of surfaces with smooth curves (FIG. 7C). Shifts between the odd and even layers 720 could improve uniformity of the cured pattern and also reduce jaggedness of the external edges of a 3D object to be manufactured. Intentional, small shifts between the odd and even layers could also be introduced in manufacture of objects with curved external surfaces 730 (FIG. 7D).

Support 110 displacement could be intentional or as a result of an error in support displacement. Support 110 displacement errors are possible and also depending on the type of 3D pattern produced in the surface 200 of container 102 bottom 104 they are not affecting object 108 manufacture.

Typically, apparatus 100 also includes some mechanisms or arrangements configured to completely separate manufactured 3D object 108 from radiation curable resin 106 and tank 102. Any suitable mechanism could be used for the purpose of removing manufactured object 108 from apparatus 100.

Figure 8A:
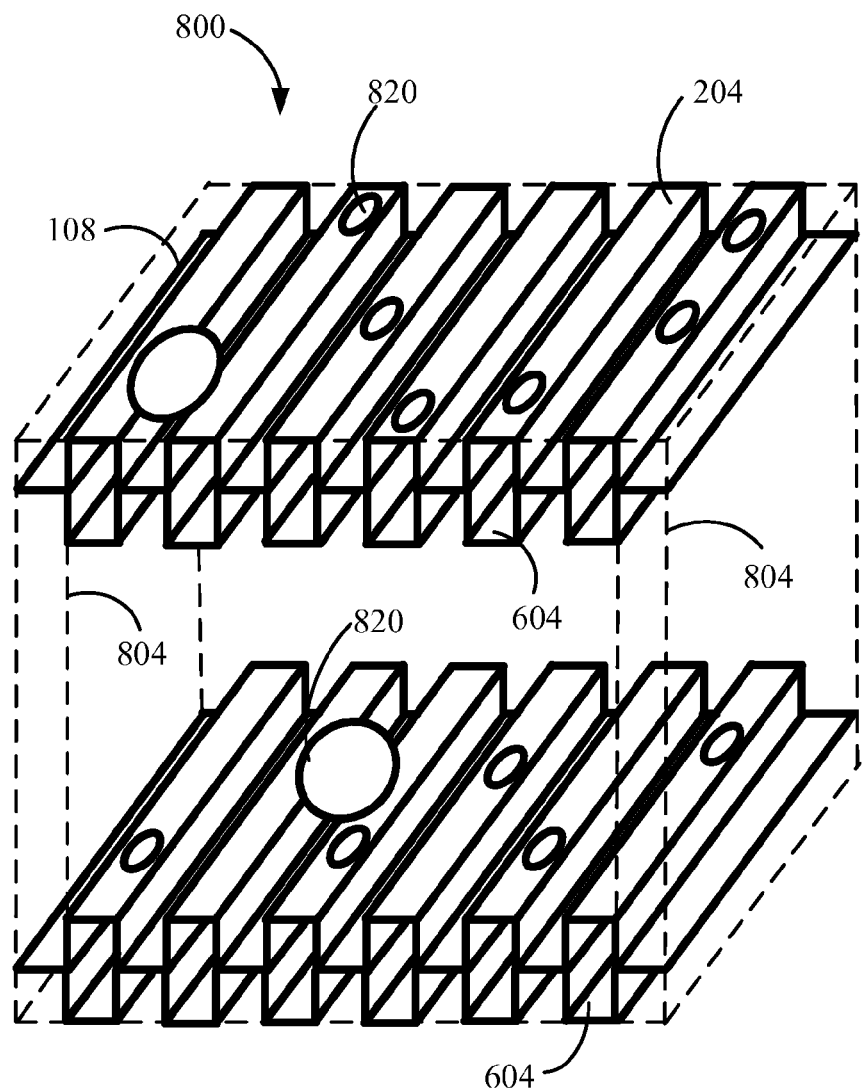
FIGS. 8A and 8B are schematic illustrations of a manufactured 3D object according to an example.
Figure 8B:
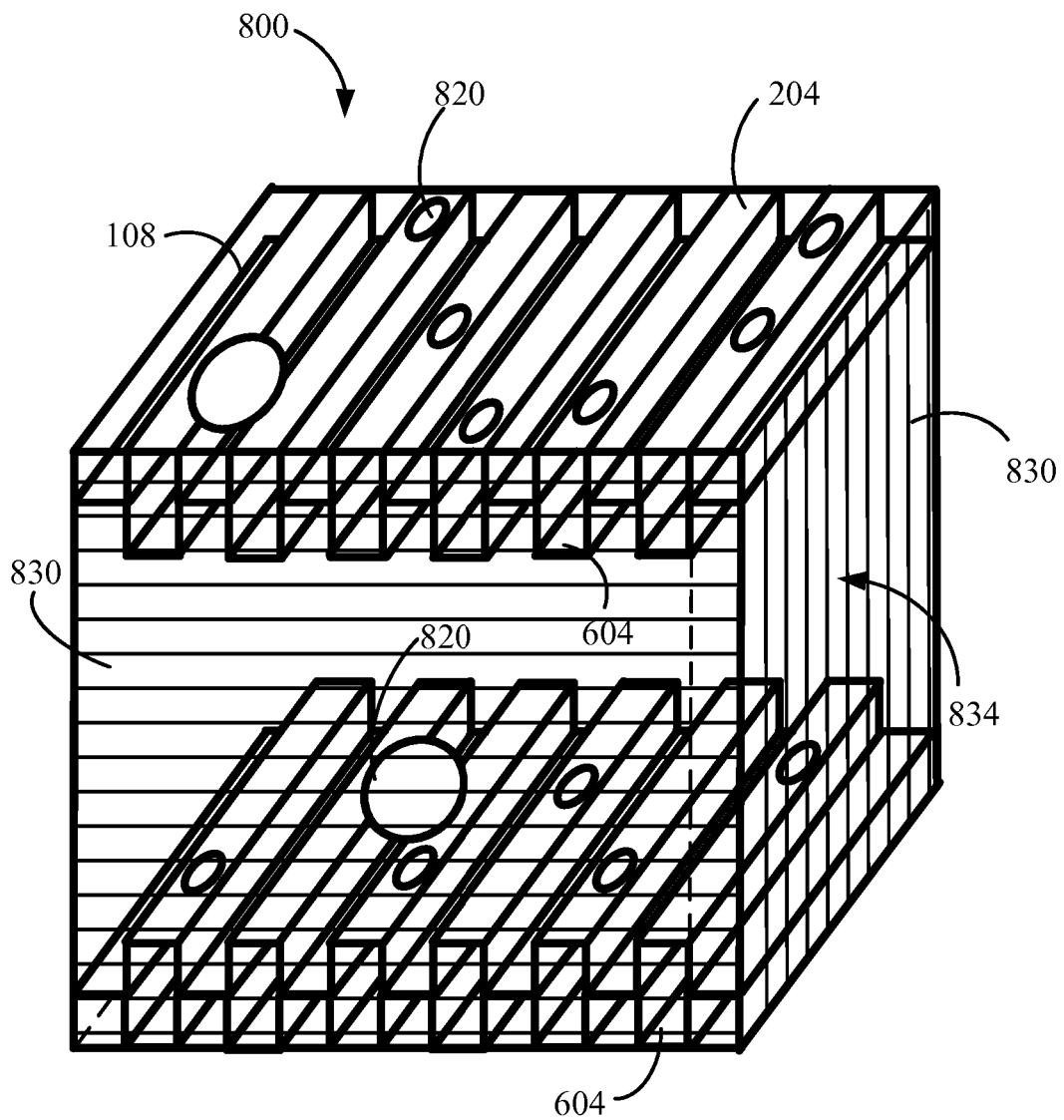

FIG. 8A is a schematic illustration of a manufactured 3D object according to an example. 3D object 108 is manufactured as a stack of solidified 3D layers 204. A desired outer surface quality of the 3D object could be manufactured by selecting proper amplitude "h" of the 3D pattern of tank 102 bottom surface 200 (FIG. 5) and support 110 (FIG. 1) displacement value. In some examples, it could be desired to produce a completely solid 3D object, for example such as object 800 external borders of which are shown by broken lines 804. This could be achieved, as illustrated in FIG. 8B by employing a 3D pattern including extensions supporting formation of walls 830 manufactured from the same radiation-curable resin. 3D object 800 manufactured with walls 830 could be filled in with a low cost radiation curable or heat curable material 834, which would occupy hollow volumes 604. Material 834 could be solidified by curing radiation or heat.

Alternatively, 3D object 108 could be manufactured as a stack of solidified 3D layers 204. In some examples, it could be desired to produce a completely solid 3D object, for example such as object 800 (FIG. 8A) external borders of which are shown by broken lines 804. This could be achieved by placing the earlier manufactured and separated from base 118 3D object 108 into a suitable size tank 900 (FIG. 9), which could be made of opaque or transparent material. Typically, the size of tank 900 would match the external dimensions of manufactured object 108. Tank 900 with placed into it manufactured object 108 could be filled in with a low cost radiation curable or heat curable material 906, which would fill in hollow volumes 604. Material 906 could be solidified by curing radiation or heat. One or more curing radiation sources 910 could be placed around object 108 to facilitate faster curing. Alternatively, tank 900 with object 108 could be placed into a furnace (not shown) and heated to a suitable temperature sufficient to cure or solidify the low cost radiation curable or heat curable material 906. Such temperature could be between 60 degrees C. to 100 degrees Celsius.

Radiation source 114 of apparatus 100 (FIG. 1) configured to provide the curing radiation to cure at least a segment of the radiation-curable resin into a solid layer 204. The same radiation sources combined with, for example DLP or a scanning laser beam, could be also configured to provide at least one void (opening; hole) 820 in the solid layer of cured resin 204. Voids or holes 820 (FIG. 8) are manufactured to support drainage of at least a part of the liquid low cost radiation curable or heat curable material 906 into hollow volumes 604 of 3D object 108 as well as support trapped air evacuation. Voids 820 could be small or large and one void could include a number of 3D structures. Large voids 820, especially ones made in the inner volumes of the object could save expensive radiation-curable resin and reduce the weight of the 3D object.

Figure 9:
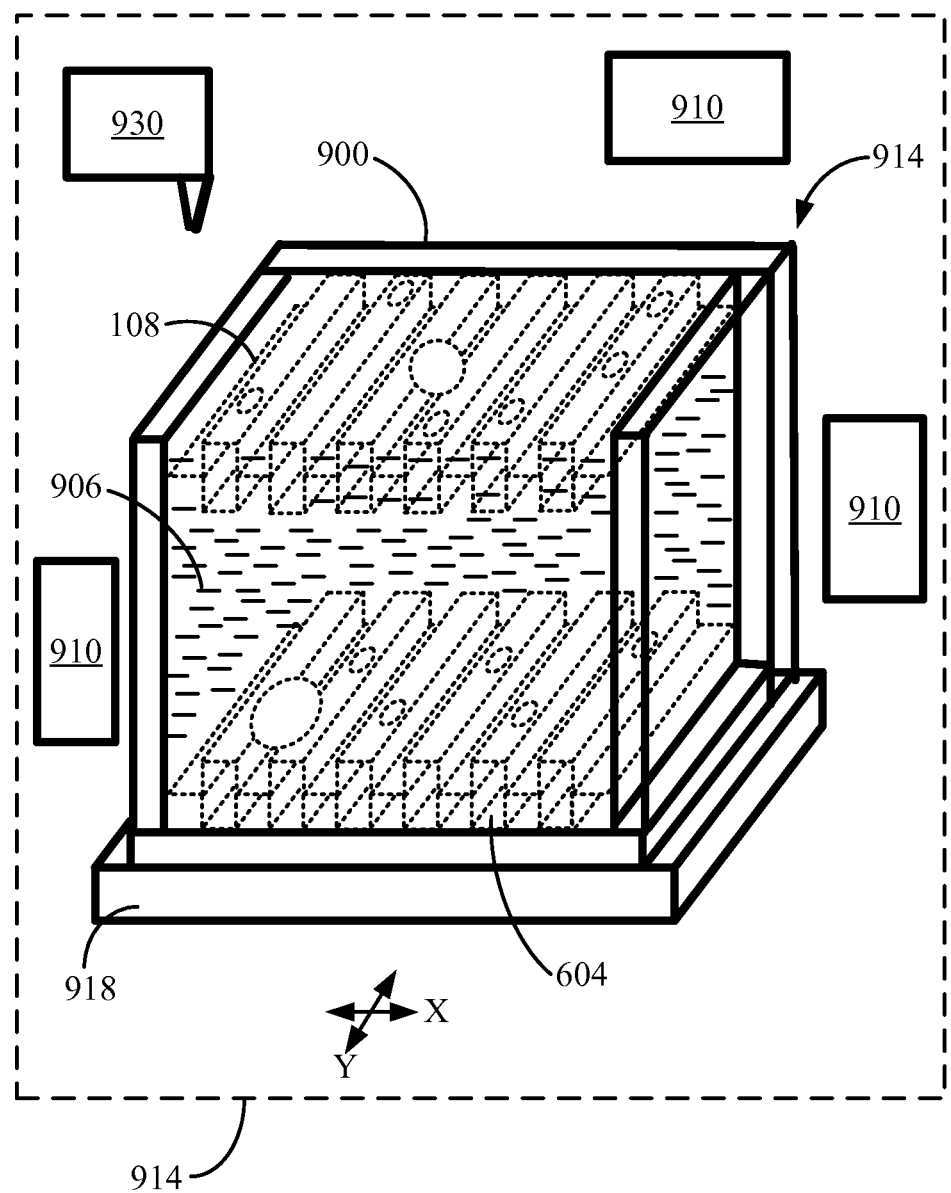
FIG. 9 is a schematic illustration of a post-processing low cost radiation curable or heat curable material solidifying station.

In one example, illustrated in FIG. 9, tank 900 with a low cost radiation curable or heat curable material 906 and manufactured object 108 could be implemented as a stand-alone or in-line material solidifying station 914 or simply a post-processing station. Tank 900 could be placed on a motorized support 918 configured to support tank 900 with the three dimensional object or structure 108. Support 918 could support movement in two directions, for example X and Y. A low cost radiation curable or heat curable material 906 dispensing facility 930, a number of radiation curing units 910 could be arranged around tank 900. Computer 138 (FIG. 1) could be configured to control the motorized support 918 and displace it in one or both X and Y directions, the dispensing facility configured to dispense the low cost radiation-curable or heat curable material across tank 900, such as to fill with the radiation or heat curable material the hollow spaces 604 of the three dimensional object 108; and radiation or heat sources 910 configured to provide the curing radiation to cure the low cost radiation-curable resin into a solid body.

Figure 10A:
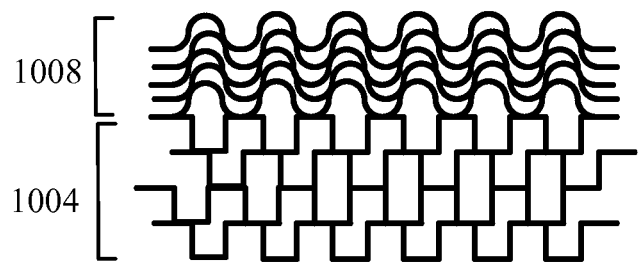
FIGS. 10A through 10C are schematic illustrations of an example of a 3D object that includes volumes with different properties and different 3D structures.
Figure 10B:
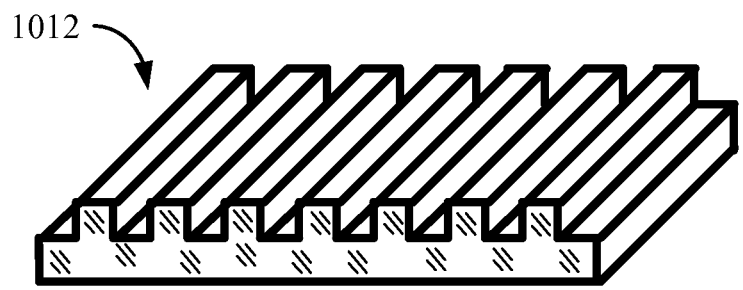
Figure 10C:
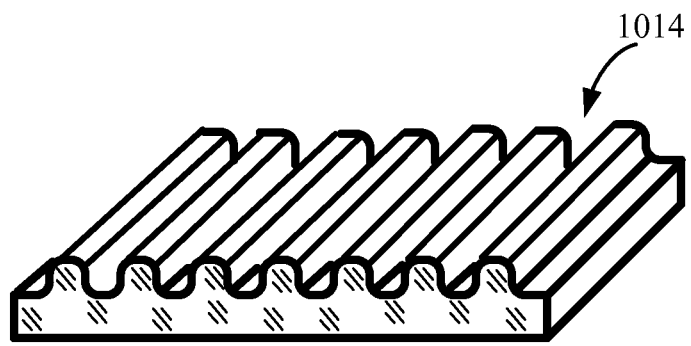

Different 3D objects could require use of different curing materials and even different 3D pattern structures. This could be achieved by exchanging bottom 104 of container 102 on a bottom with a different 3D pattern. In some examples (FIGS. 10A-10C) the 3D object could include different 3D patterns. FIG. 10A illustrates a 3D object a volume 1004 of which is manufactured using a bottom with a first type of the 3D pattern and a volume 1008 of which is manufactured using a second type of the 3D pattern. This could be of help when the 3D object should include volumes with different structure, manufactured from different material or have different properties. The present system supports exchange of bottom 1012 (FIG. 10B) of a container on a bottom 1014 (FIG. 10C) with a different 3D pattern even in course of manufacture of the same 3D object.

Figure 11:
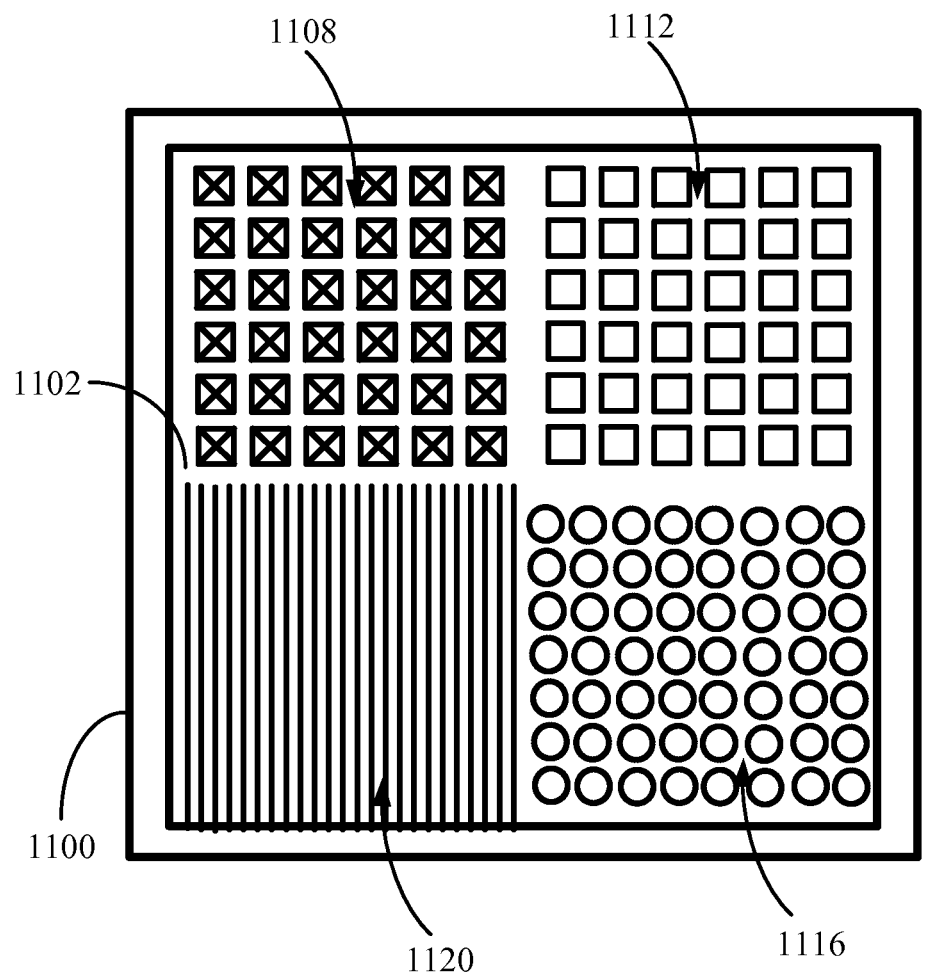
FIG. 11 is a schematic illustration of an example of a container with bottom surface including different 3D structures.

In one example illustrated in FIG. 11, container 1100 similar to container 100 could be made large enough to support production of different 3D structures on different segments of bottom 1102 surface. For example, each of segments 1108 through 1120 could include a different 3D pattern. Different volumes of a 3D object that require different structures could be manufactured simultaneously and later connected together in one 3D object.

It will also be appreciated by persons skilled in the art that the present method and system are not limited to what has been particularly shown and described hereinabove. Rather, the scope of the method and system includes both combinations and sub-combinations of various features described hereinabove as well as modifications and variations thereof which would occur to a person skilled in the art upon reading the foregoing description and which are not in the prior art.

We claim:

1. A system for additive manufacturing comprising:
   an apparatus including:
   a container configured to contain a radiation-curable resin, the container includes a bottom with a 3D pattern thereon, the pattern being in contact with the radiation-curable resin, the bottom being at least partially transparent to curing radiation; and
   a radiation source configured to provide the curing radiation to cure at least a portion of the radiation-curable resin and form a three dimensional structure with voids and hollow spaces between cured layers located adjacent a surface of the bottom that is in contact with the radiation-curable resin; and a post processing station including:
  a tank configured to receive the three dimensional structure with voids and hollow spaces between cured layers; and
  a dispensing facility configured to dispense a second curable resin across the tank to fill voids and hollow spaces of the three dimensional structure,
wherein the 3D pattern of the surface of the bottom of the container is a periodic pattern in at least one direction and a non-periodic pattern.

2. The system according to claim 1 wherein said apparatus includes a support configured to support the container and displace the container along three directions and a motorized support configured to support the tank receiving the three dimensional structure.

3. The system according to claim 1 wherein further comprising an actuator configured to displace a support configured to support the container along each of three directions and a computer configured to control at least operation of the actuator.

4. The system according to claim 1 further comprising an actuator configured to displace a support along each of three directions and wherein the actuator displaces the support on a fraction of a periodic pattern period and wherein the fraction of the periodic pattern period is at least one of a group of fractions consisting of fractions equal to 0.1, 0.2, 0.3, 0.4, 0.5, 0.6, 0.7, and 0.8 of the periodic pattern period.

5. The system according to claim 3 wherein the actuator configured to displace the support along each of the three directions displaces the support on a value exceeding a periodic pattern period.

6. The system according to claim 1 wherein the radiation source configured to provide the curing radiation to cure at least a portion of the radiation-curable resin in the container into a solid layer is also configured to provide at least one void in the solid layer of cured resin.

7. The system according to claim 1 wherein at least one void provided in at least one layer of cured resin is configured to support drainage of at least a part of un-cured resin.

8. The system according to claim 1 wherein the dispensing facility is constructed and arranged to dispense the second curable resin across the tank in different doses and wherein a computer is configured to control the dispensing facility.

9. The system according to claim 1 further comprising a motorized support configured to support the tank for movement in at least two directions.

10. The system according to claim 1 wherein the second curable resin is second radiation-curable resin and the post processing station includes a radiation source configured to cure the second radiation-curable resin into a solid body.

11. The system according to claim 1 wherein the post processing station includes a motorized support configured to support and displace the tank with the three dimensional structure along each of two directions and a computer configured to control at least operation of the motorized support.

12. A method for additive manufacturing comprising:
  providing a container with a bottom at least partially transparent to curing radiation, the container containing a radiation-curable resin; and
  providing a curing radiation to cure at least a portion of the radiation-curable resin into a solid layer located adjacent a surface of the bottom that is in contact with the radiation-curable resin;
  wherein the surface of the bottom that is in contact with the radiation-curable resin bears a 3D pattern and the solid layer located adjacent the surface of the bottom of cured resin is a replica of the 3D pattern of the surface of the bottom that is in contact with the radiation-curable resin.

13. The method according to claim 12 wherein the 3D pattern forms an empty volume between earlier produced and solidified radiation-curable resin layer and a currently produced 3D object layer and wherein the method further comprises filling of the empty volume with liquid radiation-curable resin.

14. The method according to claim 12 further comprising displacing said container along at least one direction to manufacture an additional solid layer of cured resin that bears the 3D pattern of the surface of the bottom.

15. The method according to claim 12 further comprising operating a radiation source configured to provide the curing radiation to cure at least a portion of the radiation-curable resin into the solid layer such as to provide at least one void in the solid layer of cured resin to support drainage of at least a part of a liquid radiation curable material into hollow volumes of a 3D object.

16. The method according to claim 12, further comprising a post processing step including at least:
  dispensing the radiation-curable resin across the container, such as to fill with the radiation-curable resin hollow volumes of a three dimensional structure; and
  operating a radiation source configured to provide a curing radiation to cure the radiation-curable resin filling the hollow volumes into a solid body.

* * * * *